United States Patent [19]

Houlihan

[11] 3,726,978

[45] Apr. 10, 1973

[54] TETRAHYDROPYRIDAZINES AND PYRIDAZINONES AS ANTI-INFLAMMATORY AGENTS

[75] Inventor: William J. Houlihan, Mountain Lakes, N.J.

[73] Assignee: Sandoz-Wander, Inc., Hanover, N.J.

[22] Filed: Jan. 11, 1971

[21] Appl. No.: 105,605

Related U.S. Application Data

[63] Continuation-in-part of Ser. No. 680,002, Nov. 2, 1967, Pat. No. 3,586,681, which is a continuation-in-part of Ser. No. 566,719, July 21, 1966, abandoned.

[52] U.S. Cl. .................................................. 424/250
[51] Int. Cl. ......................... A61k 27/00, A61k 27/12
[58] Field of Search ....................... 260/250; 424/250

[56] References Cited

UNITED STATES PATENTS

| | | | |
|---|---|---|---|
| 3,586,681 | 6/1971 | Houlihan | 260/250 |
| 3,379,726 | 4/1968 | Montzka | 260/260 A |

*Primary Examiner*—Albert T. Meyers
*Assistant Examiner*—Leonard Schenkman
*Attorney*—Gerald D. Sharkin, Frederick H. Weinfeldt, Robert S. Honor, Walter F. Jewell, Richard E. Vila and Thomas O. McGovern

[57] ABSTRACT

1-Lower alkyl-3-substituted-1,4,5,6-tetrahydropyridazines, and the corresponding 2-lower alkyl-6-substituted-4,5-dihydro-3(2H)-pyridazinones are useful as anti-inflammatory agents.

11 Claims, No Drawings

TETRAHYDROPYRIDAZINES AND PYRIDAZINONES AS ANTI-INFLAMMATORY AGENTS

This application is a continuation-in-part of application Ser. No. 680,002, filed Nov. 2, 1967, which issued as U.S. Pat. No. 3,586,681 on June 22, 1971 which in turn is a continuation-in-part of application Ser. No. 566,719, filed July 21, 1966, now abandoned.

This invention relates to 1,4,5,6-tetrahydropyridazine derivatives. In particular, this invention pertains to certain 1,3-substituted 1,4,5,6-tetrahydropyridazines and their acid addition salts, intermediates in the preparation thereof and processes for the preparation of such compounds. This invention also relates to pharmaceutical compositions containing the said above compounds and the therapeutic use of such pharmaceutical compositions.

The lower alkyl substituted compounds contemplated by the present invention have the following formula

wherein A
is phenyl having from 1 to 2 substituents, pyridyl, thienyl or furyl,
each of said phenyl substituents being, independently, halogen having an atomic weight of from 19 to 36, trifluoromethyl, lower alkyl or lower alkoxy, R is lower alkyl and X is —CH₂— or

With respect to the above-mentioned phenyl substituents, preferred lower alkyl substituents are straight chain alkyl having from one to four carbon atoms, e.g., methyl, ethyl, n-propyl and n-butyl; preferred alkoxy substituents are straight chain alkoxy having from one to four carbon atoms, e.g., methoxy, ethoxy, n-propoxy and n-butoxy, and the halogen substituents include fluorine and chlorine.

Representative substituted phenyl functions suitable as -A include p-methoxyphenyl, p-chlorophenyl, 3,4-dichlorophenyl, p-fluorophenyl and p-tolyl.

Pyridyl, thienyl and furyl functions suitable as -A include 2-, 3- and 4-pyridyl, 2- and 3-thienyl and 2- and 3-furyl.

With respect to —R, the preferred lower alkyl functions have from one to four carbon atoms, such as methyl, ethyl, propyl, isopropyl, n-butyl, isobutyl and t-butyl.

Compounds of formula I in which X is —CH₂—(Ia) are obtained by the reduction of the corresponding carbonyl-containing intermediates, i.e. 2,6-substituted 4,5-dihydro-3(2H)-pyridazinones of formula Ib

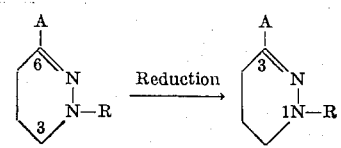

in which A and R are as defined above.

The reduction of a compound of Formula Ib to its corresponding compound of Formula Ia may be effected by conventional means for reducing a carbonyl to a methylene (Step A), e.g., by the use of lithium aluminum hydride (LAH) in an inert solvent, such as tetrahydrofuran (THF), diethyl ether or dibutyl ether at temperatures of from about 20° to 150°C, preferably at reflux temperatures, and in a nitrogen atmosphere. It is also preferred to use the reducing agent in a ratio of from 1.0 to 1.8 equivalents per equivalent of the compound of Formula Ib.

The compounds of Formula Ib may be prepared by condensation (Step B) of a suitable γ-ketobutyric acid, i.e. a compound of Formula II.

in which A is as defined above, with a hydrazine of Formula III

in which R is as defined above.

The condensation (Step B) may be carried out in a conventional manner. For example, the condensation may be carried out by heating an intimate mixture of a compound of Formula II and a compound of Formula III, preferably in an inert solvent, e.g., toluene, preferably in the presence of an acid-acting catalyst, such as an arylsulfonic acid, e.g., para-toluene sulfonic acid monohydrate, and at temperatures of from about 60° to 150°, preferably at reflux temperatures. It is preferred to remove water formed in the reaction, for example, by selecting a solvent which forms an azeotrope with water but is water immiscible, thus permitting use of a Dean-Stark tube to remove water from the reaction system. While compounds of Formula II, theoretically, react with compounds of Formula III in a molar ratio of 1:1 to form the corresponding compound of Formula Ib, it is preferred to carry out this condensation reaction using an excess of the compound of Formula III, e.g., using from 10 to 100 mole percent excess of the compound of Formula III.

The compounds of Formulas II and III are either known and can be prepared as described in the literature or can be prepared from known starting materials in analogous manner to that described in the literature for the preparation of known compounds.

The relationship of the above-mentioned reactions may be conveniently illustrated as follows:

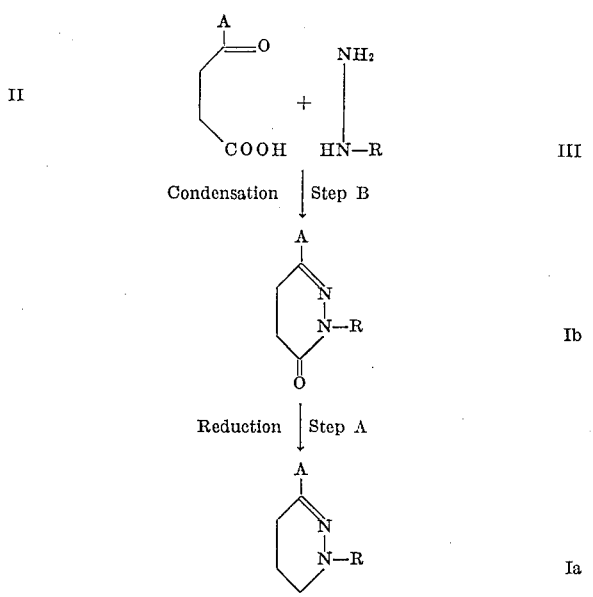

The compounds of formula I are useful because they possess pharmacological activity in animals. In particular, the compounds of formula Ia, as well as the compounds of formula Ib, are useful as anti-inflammatory agents, as indicated by the carrageenan-induced test on the white rat paw. For such use, the compounds may be admixed with conventional pharmaceutical carriers or diluents and administered internally (orally or parenterally) in the form of tablets, capsules, elixirs, solutions or suspensions. Furthermore, those compounds which are bases, i.e., all the compounds of formula Ia and those compounds of formula Ib where A is a pyridyl moiety, may also be administered in the form of their non-toxic pharmaceutically acceptable acid addition salts.

Such salts possess the same order of activity of the free base, are readily prepared by reacting the base with an appropriate acid and accordingly are included within the scope of the invention. Representative of such salts are the mineral acid salts, such as the hydrochloride, hydrobromide, sulfate, phosphate and the like and the organic acid salts, such as the succinate, benzoate, acetate, p-toluenesulfonate, benzenesulfonate and the like.

For the above-mentioned use, the dosage administered will, of course, vary depending upon the compound employed, mode of administration and treatment desired. However, in general, satisfactory results are obtained when administered at a daily dosage of from about 10 milligrams per kilogram of body weight to about 100 milligrams per kilogram of body weight preferably given in divided doses 2 to 6 times a day or in sustained release form. For the larger mammals as well as the smaller domestic mammals, total daily dosage is generally from about 200 milligrams to about 3000 milligrams, and dosage forms suitable for internal administration comprise from about 35 milligrams to about 500 milligrams of the compound admixed with a solid or liquid pharmaceutical carrier or diluent.

Pharmaceutical compositions containing said compounds may be prepared according to any method known in the art for the manufacture of pharmaceutical compositions, and such compositions may contain one or more conventional adjuvants, such as sweetening agents, flavoring agents, coloring agents and preserving agents, in order to provide an elegant and palatable preparation. Tablets may contain the active ingredient in admixture with conventional pharmaceutical excipients, e.g., inert diluents, such as calcium carbonate, sodium carbonate, lactose and talc, granulating and disintegrating agents, e.g., starch and alginic acid, binding agents, e.g., starch, gelatin and acacia, and lubricating agents, e.g., magnesium stearate, stearic acid and talc. The tablets may be uncoated or coated by known techniques to delay disintegration and absorption in the gastro-intestinal tract, if desired. Similarly, oral liquids, e.g., suspensions, syrups and elixirs may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan monooleate) and preservatives (ethyl-p-hydroxybenzoate). Capsules may contain the active ingredient alone or admixed with an inert solid diluent, e.g., calcium carbonate, calcium phosphate and kaolin. The injectable compositions are formulated as known in the art and may contain appropriate dispersing or wetting agents and suspending agents identical or similar to those mentioned above. These pharmaceutical preparations may contain up to about 90 percent of the active ingredient in combination with the carrier or adjuvant.

The preferred pharmaceutical compositions from the standpoint of preparation and ease of administration are solid compositions, particularly hard-filled capsules and tablets containing from about 100 milligrams to about 500 milligrams of the active ingredient.

The following examples serve to further illustrate the present invention. However, it is to be understood that the examples are for purposes of illustration only and are not intended as in any way limiting the scope of the invention which is defined in the appended claims. Furthermore, it is to be understood that the active ingredient used in Examples 14 and 15 can be replaced by any of the other compounds described hereinabove and there are likewise obtained pharmaceutical compositions suitable for the treatment of inflammations.

EXAMPLE 1

6-(p-chlorophenyl)-2-methyl-4,5-dihydro-3(2H)-pyridazinone

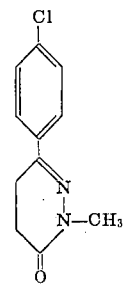

To a flask equipped with a heater, a stirrer and a reflux condenser fitted with a Dean-stark tube is charged 21.3 g (0.10 mole) of 3-(p- chlorobenzoyl)propionic acid, 6.9 g (0.15 mole) of methylhydrazine, 0.1 g of p-toluene sulfonic acid monohydrate and 300 ml of toluene. The mixture in the flask is stirred, heated to maintain refluxing and water is continuously removed from the system. After formation of water of reaction ceases, the reaction mixture is allowed to cool, removed from the flask and the toluene substantially removed under vacuum in a rotary evaporator to obtain a residue. The residue is crystallized from methanol-water (2:1) to obtain 6-(p-chlorophenyl)-2-methyl-4,5-dihydro-3(2H)-pyridazinone, mp 76° to 78° C.

Following the above procedure but using an equvialent amount of 3-(p-trifluoromethylbenzoyl)propionic acid or 3-(p-toluoyl)propionic acid in place of the 3-(p-chlorobenzoyl)propionic acid used therein, there is obtained 6-(p-trifluoromethylphenyl)-2-methyl-4,5-dihydro-3(2H)-pyridazinone or 6-(p-tolyl)-2-methyl-4,5-dihydro-3(2H)-pyridazinone, respectively.

EXAMPLE 2

3-(p-chlorophenyl)-1-methyl-1,4,5,6-tetrahydropyridazine

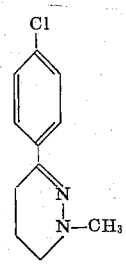

To a flask equipped with a heater, a stirrer, a reflux condenser and an addition funnel is charged 2.38 g (0.063 mole) of lithium aluminum hydride and 300 ml anhydrous diethyl ether. The system is blanketed with dry nitrogen gas and a solution of 11.13 g (0.05 mole) of 6-(p-chlorophenyl)-2-methyl-4,5-dihydro-3(2H)-pyridazinone (obtained as described in Example 1) in 300 ml of anhydrous diethyl ether is added dropwise, with stirring, over a period of 0.5 hour. The resulting mixture is refluxed for 15 hours, then cooled in an ice bath. To the cooled mixture is added frist dropwise 4.8 ml of 2N sodium hydroxide with 6.9 ml of water and then 15 g of anhydrous sodium sulfate. The solids are removed from the mixture by filtration, and the filtrate is then evaporated under vacuum in a rotary-evaporator to obtain a residue. The residue is then dissolved in 50 ml of chloroform. The chloroform solution is then chromatagraphed through a silica gel column to obtain, by eluting with chloroform, 3-(p-chlorophenyl)-1-methyl-1,4,5,6-tetrahydropyridazine, which is then crystallized from pentane, mp 52° to 54°C.

When an equivalent amount of 6-(p-trifluoromethylphenyl)-2-methyl-4,5-dihydro-3(2H)-pyridazinone or 6-(p-tolyl)-2-methyl-4,5-dihydro-3(2H)-pyridazinone is substituted for 6-(p-chlorophenyl)-2-methyl-4,5-dihydro-3(2H)-pyridazinone in the above process, there is obtained 3-(p-trifluoromethylphenyl)-1-methyl-1,4,5,6-tetrahydropyridazine or 3-(p-tolyl)-1-methyl-1,4,5,6-tetrahydropyridazine, respectively.

EXAMPLE 3

6-(p-methoxyphenyl)-2-methyl-4,5-dihydro-3(2H)-pyridazinone

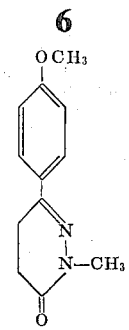

Reacting 68.5 g (0.33 mole) of 3-(p-anisoyl)-propionic acid with 20.7 g (0.45 mole) of methylhydrazine in 500 ml of toluene in the presence of 0.5 g of p-toluene sulfonic acid monohydrate, as described in Example 1, 6-(p-methoxyphenyl)-2-methyl-4,5-dihydro-3(2H)-pyridazinone is obtained; mp 129° to 130°, crystallized from methylene chloride-pentane (1:1).

EXAMPLE 4

3-(p-methoxyphenyl)-1-methyl-1,4,5,6-tetrahydropyridazine

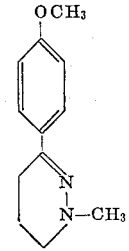

Reacting 62 g (0.284 moles) of 6-(p-methoxyphenyl)-3-methyl-4,5-dihydro-3(2H)-pyridazinone obtained as described in Example 3, in 800 ml of anhydrous diethyl ether with 21.6 g (0.57 mole) of lithium aluminum chloride in 2000 ml of anhydrous diethyl ether, as described in Example 2, 3-(p-methoxyphenyl)-1-methyl-1,4,5,6-tetrahydropyridazine; is obtained, mp 77° to 79° C, crystallized from methanol-water (1:1).

EXAMPLE 5

2-methyl-6-(2-thienyl)-4,5-dihydro-3(2H)-pyridazinone

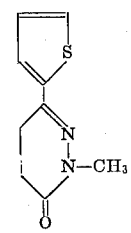

Reacting 36.8 g (0.20 mole) of 3-(2-thenoyl)-propionic acid with 13.8 g (0.30 mole) of methylhydrazine in 300 ml toluene in the presence of 0.5 g of p-toluene sulfonic acid monohydrate, as described in Example 1, 2-methyl-6-(2-thienyl)-4,5-dihydro-3(2H)-pyridazinone is obtained, mp 104° to 105° C. crystallized from chloroform-pentane (2:1).

When an equivalent amount of 3-(2-pyridyl)-propionic acid or 3-(2-furyl)-propionic acid is used in place of 3-(2-thenoyl)-propionic acid in the above process there is obtained 2-methyl-6-(2-pyridyl)-4,5- dihydro-3(2H)-pyridazinone or 2-methyl-6-(2-furyl)-4,5-dihydro-3(2H)-pyridazinone, respectively.

EXAMPLE 6

1-methyl-3-(2-thienyl)-1,4,5,6-tetrahydropyridazine

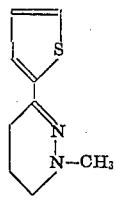

Reacting 14.55 g (0.075 mole) of 2-methyl-6-(2-thienyl)-4,5-dihydro-3(2H)-pyridazinone in 500 ml of anhydrous diethyl ether and 150 ml of anhydrous tetrahydrofuran with 3.56 g (0.094 mole) of lithium aluminum hydride in 300 ml of anhydrous diethyl ether, as described in Example 2 to obtain an oily residue containing 1-methyl-3-(2-thienyl)-1,4,5,6-tetrahydropyridazine. The oily residue is distilled at 120° C. and 0.5 mm Hg in a Kugelrohr tube to obtain 1-methyl-3-(2-thienyl)-1,4,5,6-tetrahydropyridazine.

When an equivalent amount of 2-methyl-6-(2-pyridyl)-4,5-dihydro-3(2H)-pyridazinone or 2-methyl-6-(2-furyl)-4,5-dihydro-3(2H)-pyridazinone is used in place of the 2-methyl-6-(2-thienyl)-4,5-dihydro-3(2H)-pyridazinone in the above process, there is obtained 1-methyl-3-(C2-pyridyl)-1,4,5,6-tetrahydropyridazine or 1-methyl-3-(2-furyl)-1,4,5,6-tetrahydropyridazine, respectively.

EXAMPLE 7

6-(3,4-dichlorophenyl)-2-methyl-4,5-dihydro-3(2H)-pyridazinone

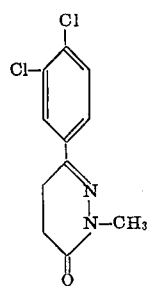

Reacting 24.7 g (0.10 mole) of 3-(3,4-dichlorobenzoyl)-propionic acid with 6.9 g (0.1 mole) of methylhydrazine in 300 ml of toluene in the presence of 0.1 g of p-toluene sulfonic acid monohydrate, as described in Example 1, 6-(3,4-dichlorophenyl)-2-methyl-4,5-dihydro-3(2H)-pyridazinone, is obtained, mp 127° to 129°C, crystallized from methanol-water (2:1).

EXAMPLE 8

3-(3,4-dichlorophenyl)-1-methyl-1,4,5,6-tetrahydropyridazine

Reacting 12.85 g (0.05 mole) of 6-(3,4-dichlorophenyl)-2-methyl-4,5-dihydro-3(2H)-pyridazinone, obtained as described in Example 15, in 600 ml. of anhydrous diethyl ether with 2.38 g (0.063 mole) of lithium aluminum hydride in 300 ml of anhydrous diethyl ether, as described in Example 2, 3-(3,4-dichlorophenyl)-1-methyl-1,4,5,6-

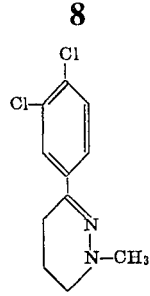

tetrahydropyridazine is obtained, mp 43° to 45°C, chromatographed through silica gel with chloroform and crystallized from pentane.

EXAMPLE 9

TABLETS

Tablets suitable for oral administration and containing the following ingredients are prepared by conventional tabletting techniques.

| Ingredient | Weight (mg) |
|---|---|
| 1-methyl-3-(2-thienyl)-1,4,5,6-tetrahydropyridazine | 250 |
| tragacanth | 10 |
| lactose | 197.5 |
| corn starch | 25 |
| talcum | 15 |
| magnesium stearate | 2.5 |

The tablets so prepared are useful in the treatment of inflammations at a dose of one tablet, 2 to 6 times a day, i.e., 500 to 1500 mg per diem.

EXAMPLE 10

DRY FILLED CAPSULES

Capsules suitable for oral administration containing the following ingredients are prepared in conventional manner.

| Ingredient | Weight (mg) |
|---|---|
| 2-methyl-6-(2-thienyl)-4,5-dihydro-3(2H)-pyridazinone | 500 |
| inert solid diluent (starch, lactose or kaolin) | 500 |

The capsules so prepared are useful in the treatment of inflammations at a dose of one capsule, 1 to 3 times a day, i.e., 500 to 1500 mg per diem.

EXAMPLE 11

Tablets

Tablets suitable for oral administration which contain the following ingredients may be prepared by conventional tabletting techniques. Such tablets are useful in treating inflammation at a dose of one tablet 2 to 4 times a day.

| Ingredient | Weight (mg) |
|---|---|
| 3-(3,4-dichlorophenyl)-1-methyl-1,4,5,6-tetrahydropyridazine | 250 |
| tragacanth | 10 |
| lactose | 197.5 |
| corn starch | 25 |
| talcum | 15 |
| magnesium stearate | 2.5 |

EXAMPLE 12

Dry Filled Capsules

Capsules suitable for oral administration which contain the following ingredients are prepared in a conventional manner. Such capsules are useful in treating inflammation at a dose of one capsule 2 to 4 times a day.

| Ingredient | Weight (mg) |
|---|---|
| 3-(p-methoxyphenyl)-1-methyl-1,4,5,6-tetrahydropyridazine | 250 |
| inert solid diluent (starch, lactose, kaolin) | 250 |

EXAMPLES 13 AND 14

Sterile Suspension for Injection and Oral Liquid Suspension

The following pharmaceutical compositions are formulated with the indicated amount of active agent using conventional techniques. The injectable suspension and the oral liquid suspension represent formulations which may be administered in the treatment of inflammation. The injectable suspension is suitable for administration twice a day whereas the oral liquid suspension is suitably administered 2 to 4 times per day for this purpose.

| Ingredients | Weight (mg) sterile injectable suspension | oral liquid suspension |
|---|---|---|
| 3-(p-methoxyphenyl)-1-methyl-1,4,5,6-tetrahydropyridazine | 100 | 100 |
| sodium carboxy methyl cellulose U.S.P. | 2.5 | 25 |
| methyl cellulose | 0.8 | — |
| polyvinylpyrrolidone | 10 | — |
| lecithin | 6 | — |
| benzyl alcohol | 0.02 | — |
| magnesium aluminum silicate | — | 95 |
| flavor | — | q.s. |
| color | — | q.s. |
| methyl paraben, U.S.P. | — | 9.0 |
| propyl paraben, U.S.P. | — | 20 |
| polysorbate 80 (e.g., Tween 80), U.S.P. | — | 10 |
| sorbitol solution, 70%, U.S.P. | — | 5,000 |
| buffer agent to adjust pH for desired stability | q.s. | q.s. |
| water | for injection q.s. to 2 ml | q.s. to 10 ml |

What is claimed is:

1. A pharmaceutical composition for the treatment of inflammation comprising as an active ingredient thereof a compound of the formula

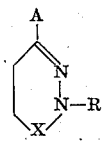

wherein A is phenyl having from 1 to 2 substituents, pyridyl, thienyl or furyl, each of said substituents being, independently, halogen having an atomic weight of from 19 to 36, trifluoromethyl, lower alkyl or lower alkoxy;
R is lower alkyl; and
X is —CH$_2$— or

or a pharmaceutically acceptable acid addition salt of said compound when X is —CH$_2$— or A is pyridyl, and a pharmaceutically acceptable carrier therefor, said compound being present in said composition to the extent of from about 35 milligrams to about 500 milligrams of said compound.

2. The composition of claim 1 in which the active ingredient is 3-(p-methoxyphenyl)-1-methyl-1,4,5,6-tetrahydropyridazine.

3. The composition of claim 1 in which the active ingredient is 2-methyl-6-(2-thienyl)-4,5-dihydro-3(2H)-pyridazinone.

4. The composition of claim 1 in which the active ingredient is 1-methyl-3-(2-thienyl)-1,4,5,6-tetrahydropyridazine.

5. The composition of claim 1 in which the active ingredient is 3-(3,4-dichlorophenyl)-1-methyl-1,4,5,6-tetrahydropyridazine.

6. The composition of claim 1 wherein the carrier is a solid orally ingestible carrier.

7. The composition of claim 1 in which said compound is present in said composition to the extent of from about 100 milligrams to about 500 milligrams per unit dosage.

8. The composition of claim 7 in tablet form.

9. A method for treating inflammation which comprises orally or parenterally administering to a mammal in need of said treatment an anti-inflammatory effective amount of the as defined in claim 1.

10. The method of claim 9 wherein the compound is administered to a mammal in need of said treatment at a daily dose of from about 200 milligrams to about 3000 milligrams.

11. The method of claim 9 wherein the compound is administered to a mammal in need of said treatment in a unit dosage form comprising said compound to the extent of from about 100 milligrams to about 500 milligrams per unit dosage.

* * * * *